United States Patent [19]

Witkowski et al.

[11] Patent Number: 5,163,404
[45] Date of Patent: Nov. 17, 1992

[54] VEHICLE ENGINE IGNITION TIMING SYSTEM AND METHOD WITH WINDOWING KNOCK CONTROL

[75] Inventors: Michael R. Witkowski, Sterling Heights; William J. Bolander, Clarkston; Kenneth R. Kridner, Holly, all of Mich.

[73] Assignees: Delco Electronics Corporation, Kokomo, Ind.; Saturn Corporation, Troy, Mich.

[21] Appl. No.: 781,724

[22] Filed: Oct. 22, 1991

[51] Int. Cl.⁵ ............................................. F02P 5/14
[52] U.S. Cl. ................................................... 123/425
[58] Field of Search ...................... 123/425, 435; 73/35

[56] References Cited

U.S. PATENT DOCUMENTS

| | | |
|---|---|---|
| 2,291,045 | 7/1942 | Lancor, Jr. |
| 2,879,665 | 3/1959 | Adams |
| 3,678,732 | 7/1972 | Arrigoni et al. .......................... 73/35 |
| 3,942,359 | 3/1976 | Arrigoni et al. .......................... 73/35 |
| 4,163,385 | 8/1979 | Kato et al. ................................ 73/35 |
| 4,164,867 | 8/1979 | Hickling et al. ........................ 73/346 |
| 4,249,494 | 2/1981 | Guipaud .............................. 123/425 |
| 4,274,379 | 6/1981 | Iwata et al. ........................... 123/425 |
| 4,279,143 | 7/1981 | Guipaud ................................. 73/35 |
| 4,364,353 | 12/1982 | Fiala ................................... 123/425 |
| 4,388,902 | 6/1983 | Latapie ................................ 123/425 |
| 4,416,235 | 11/1983 | Utsumi et al. ....................... 123/425 |
| 4,466,406 | 8/1984 | Hartung et al. ..................... 123/425 |
| 4,667,637 | 5/1987 | Staerzl ............................. 123/425 X |
| 4,969,440 | 11/1990 | Murakami et al. .................. 123/425 |
| 5,040,510 | 8/1991 | Krebs et al. ......................... 123/425 |
| 5,090,382 | 2/1992 | Bolander et al. .................... 123/425 |

*Primary Examiner*—Willis R. Wolfe
*Attorney, Agent, or Firm*—Robert M. Sigler

[57] ABSTRACT

An ignition timing system activates combustion ignition apparatus in a combustion chamber at times established at least partly in response to a knock retard value. The knock retard value is normally modified in response to a knock signal generated by a knock sensor during a knock window corresponding to a predetermined crankshaft rotational angle in which knock is to be sensed. However, if the knock signal is determined to be present at the beginning of an occurrence of the knock window, modification of the knock retard value in response to the knock signal is prevented during that occurrence of the knock window, since a knock signal already present at the beginning of the knock window is assumed to be noise.

3 Claims, 3 Drawing Sheets

VEHICLE ENGINE IGNITION TIMING SYSTEM AND METHOD WITH WINDOWING KNOCK CONTROL

BACKGROUND OF THE INVENTION

This invention relates to an ignition timing system for a spark ignited combustion engine for a motor vehicle and particularly to such a system utilizing a closed loop knock feedback control. Such systems generally provide knock correcting ignition retard in response to sensed knock in order to maintain knock at trace levels.

Most knock controlling ignition timing systems utilize a vibration sensor for detecting the engine vibrations caused by knock events in the combustion chambers and generating an output knock signal when such vibrations occur. Such sensors provide a cost advantage in that a single sensor is capable of sensing knock from all the combustion chambers in the engine. However, a problem with using an engine mounted vibration sensor for detecting knock is that it will also sense other vibrations of the engine due to movements of engine components, such a valve opening and closing and piston slap, many of which vibrations are unpredictable from engine to engine or from cycle to cycle. Such other vibrations constitute noise in the knock signal.

Improvement of the signal to noise ratio in knock detection by a vibration sensor has been given much attention by engine control engineers; and the prior art shows many systems and techniques for dealing with the problem. The development of technology in this area has been sufficiently successful that many vehicles are produced with knock control systems providing adequate to excellent knock control. However, many of the vibrations produced by noise still cannot be clearly distinguished from those produced by knock events; and the sensing of noise vibrations as knock can lead to unnecessary ignition retard with an accompanying reduction in engine performance, especially with respect to fuel economy. The smaller, higher speed engines which are becoming more popular as fuel economy expectations increase, and especially those with multiple valves per combustion chamber, appear to be especially noisy. Many of these engines severely test the limits of the present knock control technology. In today's environment, any technique which can gain an additional improvement in signal to noise ratio for a knock signal for a particular engine has the potential of providing a fuel economy increase.

One known method of noise reduction for a knock sensor of the vibration sensing type is that of knock windowing. Since knock is expected during a particular portion of the engine cycle for each combustion chamber and is much less likely to be found during the remainder thereof, the ignition timing system is thus made responsive to the knock sensor only during a predetermined crankshaft rotational angle in which knock, if present, is expected. Thus, the proportional contribution of noise to a knock signal derived from the sensor output is reduced. However, in some engines, there is a possibility of reducing the proportional contribution of noise in the knock signal even further.

SUMMARY OF THE INVENTION

When knock windowing is used in a knock controlling ignition timing system, the beginning of the knock window is generally set for a time just before any significant knock is expected. If a sufficient margin is provided, the likelihood of any significant knock vibrations being present in the sensor output at the beginning of the knock window can be made quite small. Thus, any significant sensor output at the beginning of such a knock window can, with high probability, be presumed to be noise, which is preferably not sensed, or the tail end of knock vibrations from a preceding combustion chamber, which presumably have already been sensed. If noise, such noise can also be presumed to continue for a significant portion of the knock window. Thus, the ignition timing system of this invention ignores the knock sensor output for an occurrence of a knock window at the beginning of which a significant knock signal already exists. Although some knock information may be missed during this knock window, significant noise will definitely be ignored and the signal to noise ratio will be most likely be improved.

In particular, the ignition timing system and method of this invention generates a knock signal in response to knock in a combustion chamber which is subject to contamination by noise, establishes a knock window corresponding to a predetermined crankshaft rotational angle in which knock is to be sensed, modifies a knock retard value in response to the knock signal generated during the knock window, and establishes an ignition timing for activation of the combustion ignition apparatus at least partly in response to the knock retard value. However, it is responsive to the presence of the knock signal at the beginning of an occurrence of the knock window to prevent modification of the knock retard value in response to the knock signal during the occurrence of the time window.

The improvement of the signal to noise ratio in the knock signal due to this invention has been shown, in at least one engine, to produce fuel economy and other performance benefits. Further details and advantages of the invention will be apparent from the accompanying drawings and following description of a preferred embodiment.

DESCRIPTION OF THE PREFERRED EMBODIMENT

Figure 1:
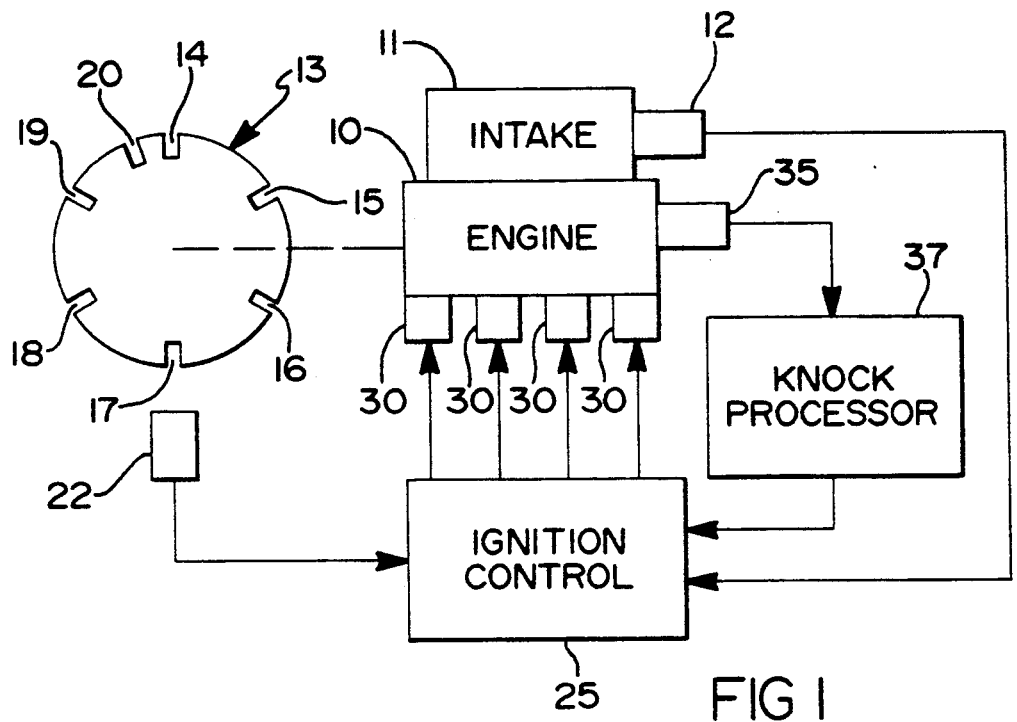
FIG. 1 is a block diagram of a vehicle engine including an ignition timing system according to the invention.

Referring to FIG. 1, an internal combustion engine 10 includes fuel intake apparatus 11 having a load sensor 12. Fuel intake apparatus 11 may be a carburetor or fuel injection system and includes an intake manifold to route the fuel charges to the various combustion chambers of the engine. Load sensor 12 may be responsive to engine vacuum or manifold absolute pressure to provide an analog electric voltage comprising the engine load signal. Engine 10 further comprises a disk 13 formed as part of the crankshaft of engine 10 having six slots 14-19 spaced 60 degrees apart rotationally and a seventh slot 20 spaced 10-20 degrees rotationally from slot 14. A magnetic or optic pickup 22 is responsive to the passage of each of slots 14-20 as disk 13 rotates with the crankshaft of engine 10 to generate crankshaft position indicating pulses from slots 14-19 and a synchronizing pulse from slot 20. Slots 14 and 17, 180 degrees apart, are so located as to indicate top dead center (TDC) of the combustion chambers of a four cylinder engine with slot 20, adjacent slot 14, indicating cylinders 1 and 3.

The pulses from pickup 22 and engine load signal from sensor 12 are provided to an ignition control 25 which fires spark plugs 30 in proper order and at optimum times in the operation of engine 10. Typically cylinders 1 and 3 are fired together alternating with cylinders 2 and 4 fired together, but only one cylinder fired at any given time has an ignitable fuel charge. Ignition control 25 may comprise a digital computer including a central processing unit (CPU), input/output (I/O) apparatus, memory including RAM and ROM which includes a stored program and standard bus, clock, addressing and synchronizing apparatus. The computer of ignition control 25 is effective to generate ignition timing signals in response to the inputs from sensor 12, pickup 22 and other sensors as appropriate in accordance with a portion of a stored program embodying the ignition control algorithm for the engine. Ignition control 25 further comprises an ignition power circuit, including ignition coils, responsive to the ignition timing signals from the computer to generate and output high voltage ignition pulses to spark plugs 30, one of which is provided for each of the four cylinders or combustion chambers of engine 10. A basic description of the system may be found in the 1987 Grand Am Service Manual published by the Pontiac Division of General Motors Corporation.

Figure 2:
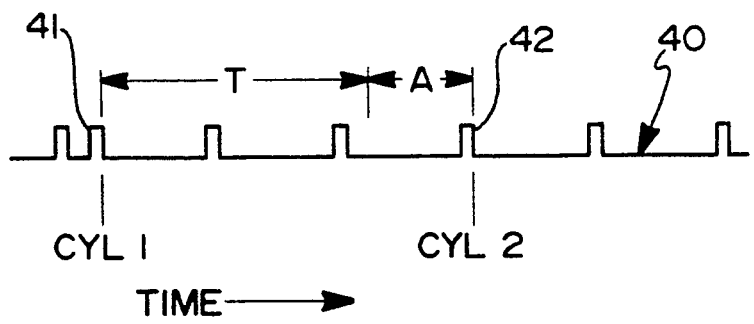
FIG. 2 is a waveform useful in understanding the operation of the engine of FIG. 1.

In operation, ignition control 25 receives pulses from pickup 22 in a waveform 40 as shown in FIG. 2 and measures the intervals between successive pulses from pickup 22. From these intervals, ignition control 25 identifies the pulses occurring at TDC of the cylinders, such as pulse 41 for cylinder 1, pulse 42 for cylinder 2 and other pulses, not shown, for cylinders 3 and 4 in four cylinder engine 10. In order to fire the spark plug of cylinder 2 with an advance relative to TDC of cylinder 2, the ignition timing signal of cylinder 2 is timed from the earlier occurring TDC of cylinder 1. With reference to FIG. 2, a spark advance "A" relative to TDC of cylinder 2 is produced by delaying the ignition timing signal for cylinder 2 by a time corresponding to crank angle "T" after TDC of cylinder 1. Since the engine speed is changeable with respect to the clock timing of the ignition control, the latter uses engine speed determined from the time periods between pulses from slots 14-19 to determine and adjust the time period corresponding to crank angle "T" in a manner known in the art.

Engine 10 is further provided with a knock sensor 35, which may be any vibration or other sensor known in the art for producing a signal of a knock related engine parameter. Sensor 35 provides an output signal to a knock processor 37 which substantially reduces the noise in the signal of sensor 35 and generates a knock signal when knock occurs. The knock signal output of knock processor 37 may be in the form of a count in a counter which is increased in response to each identified knock event or condition.

Figure 3:
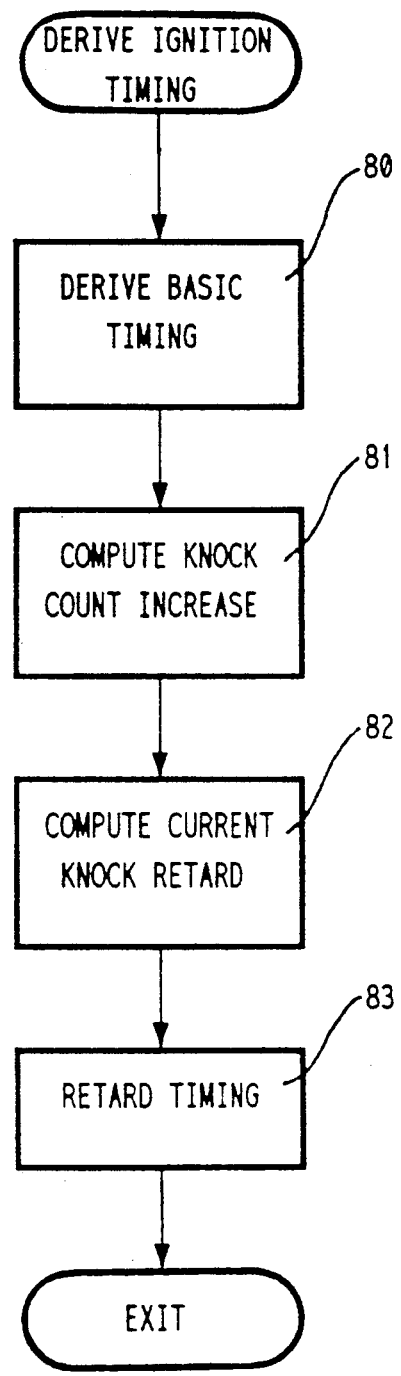
FIGS. 3-5 show flowcharts describing the operation of the ignition system of this invention.

Ignition control 25 derives ignition timing in a manner described with reference to the flow chart of FIG. 3: DERIVE IGNITION TIMING. This flow chart describes a subroutine or other portion of the engine control program which repeats every 12.5 milliseconds. In step 80, a basic advance is derived from engine speed, load and other sensed operating parameters as is well known to those skilled in the art. For example, the basic timing may be a value derived from a lookup table in ROM referenced in a two-dimensional array of engine speed and load parameters, the engine speed parameter being derived from the time durations between pulses from pickup 22 and slots 14-19 in disc 13 and the engine load parameter being derived from sensor 12. The actual value of the basic timing may be further modified by other engine operating parameters such as engine coolant temperature, fuel composition, etc. This basic timing may be expressed for convenience in degrees after TDC of the previous firing cylinder. In step 81, the increase in the current knock count is computed. In practice, a value NOK, which represents the total of the increase in detected knock count over the last 12.5 milliseconds, is stored as a variable KNOCK; and the value of NOK is cleared to zero to be immediately available for incrementing during the next 12.5 millisecond period.

The current knock retard is based on the value of KNOCK and is derived in step 82. Generally, the value of KNOCK may be adjusted by one or more gain or scaling factors, which might be based on some engine operating parameter such as engine speed, and added to a previously computed and stored current knock retard from the previous cycle. If there has been no knock since the previous cycle, the current knock retard may be unchanged; and if there has been no knock for some longer predetermined time, a constant reduction factor may be adjusted by similar gains or scaling factors and subtracted from the stored current knock retard from the previous cycle. In this way, the current knock retard may be increased upward quickly in response to knock and decreased more slowly in the absence of knock. The adjusted value of KNOCK as determined in step 82 is then added to the basic timing in step 83 to provide the actual ignition timing corrected for knock; and ignition timing signals are generated accordingly with reference to crankshaft position and output to ignition control 25 to initiate combustion in the proper combustion chamber.

Figure 4:
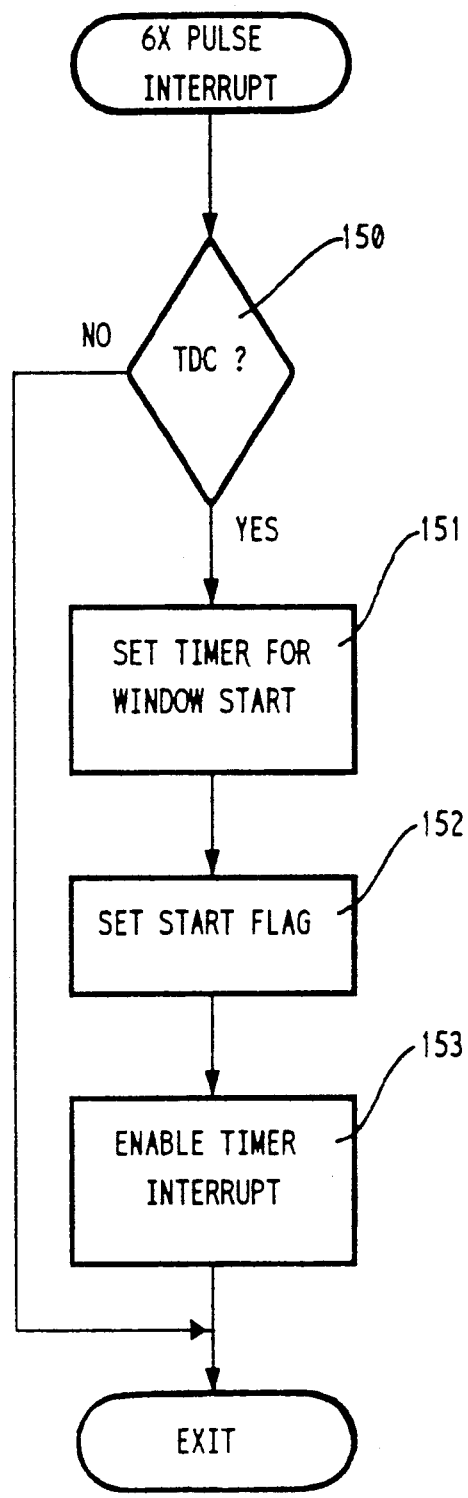

The value of NOK during each 12.5 millisecond period is derived by selectively examining the knock counter during certain window periods and adding the changes in knock count occurring during those window periods. This operation is controlled by a pair of interrupt routines described in FIGS. 4 and 5. Each of these interrupt routines operates completely asynchrously with respect to the 12.5 millisecond routine already described. The 6X PULSE INTERRUPT routine shown in FIG. 4 is called with each of the equally spaced pulses (six per revolution) produced by sensor 22 in response to slots 14-19 of disk 13 as previously described. The TIMER INTERRUPT routine shown in FIG. 5 is called by a free running timer which is programmed to call the interrupt at times determined during operation of the system.

Referring to FIG. 4, the 6X PULSE INTERRUPT routine begins by determining at decision point 150 whether the pulse which produced the interrupt is a top dead center (TDC) pulse. As previously described, every third such pulse is a TDC pulse; and the other pulses result in exit from the 6X PULSE INTERRUPT routine. However, with a TDC pulse, the timer is set for window start in step 151. This is accomplished by adding to the time of TDC, which is read at the interrupt, a time derived from a lookup table as a function of engine speed and, if desired, other engine operating parameters. The values in the lookup table are calibrated to produce a beginning of the knock window at a time after ignition but before the expected beginning of knock vibrations, if they occur, so that no knock signal would be expected at the beginning of the knock window. A START flag is set in step 152; and the timer interrupt is enabled in step 153. At very high engine speeds, it might be possible that the time of window start will already have been passed before the timer interrupt is enabled. If desired, this possibility may be handled by determining, after step 151, if the time is past and, if so, increasing the time by an amount sufficient to guarantee a timer interrupt, so that the system need not wait for counter roll-over.

Figure 5:
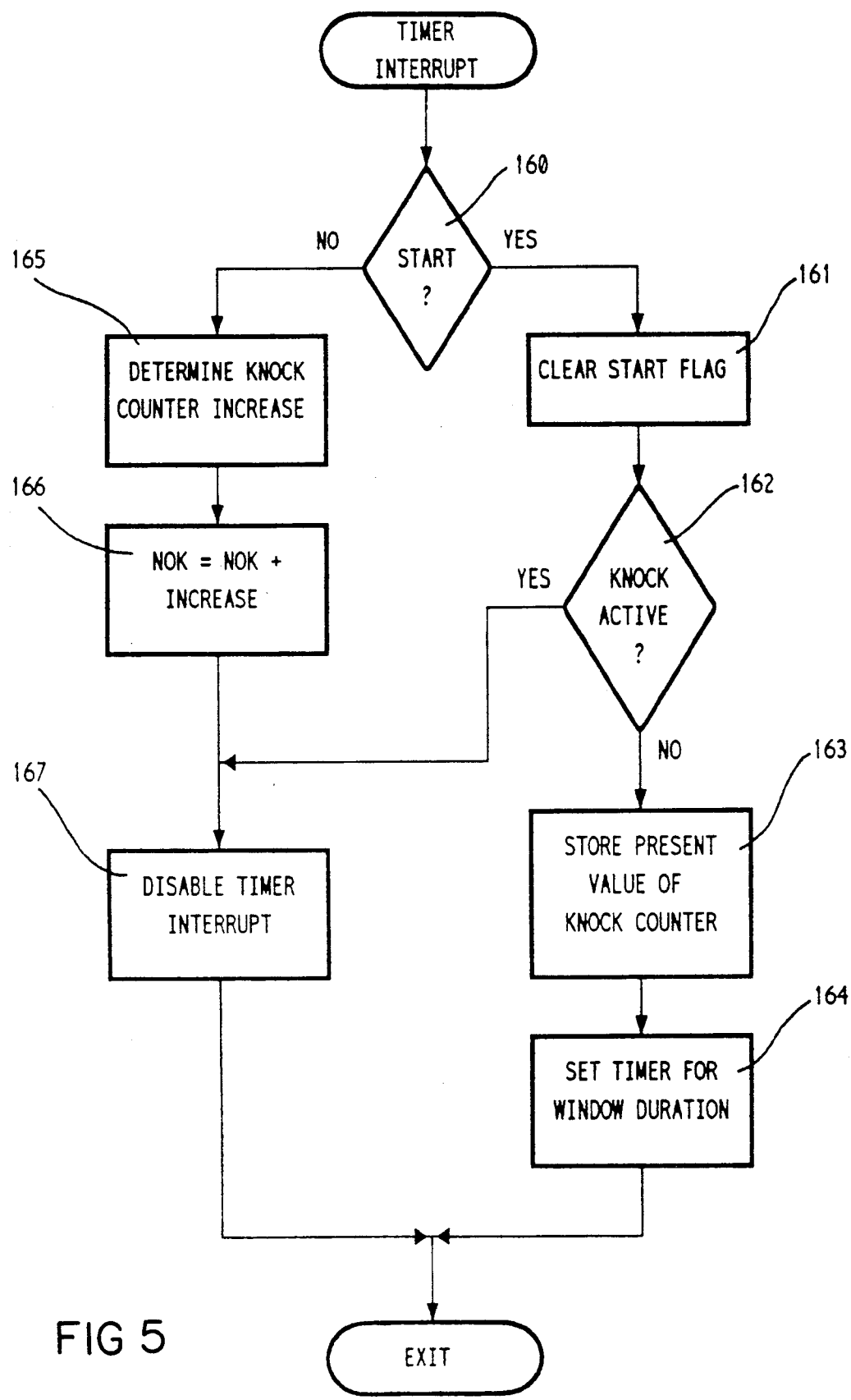

Referring to FIG. 5, the TIMER INTERRUPT routine begins by determining, at decision point 160, if the START flag is set. If so, this is the first timer interrupt after TDC, which designates the beginning of the knock window period in which knock is to be detected. The START flag is cleared in step 161; and it is determined at decision point 162 if knock is currently active. This may be easily accomplished, in ESC equipped ignition control systems provided by the Delco Electronics Corporation, by referring to a register which indicates, at any given time, if knock is currently being detected. If such a register is not available, many alternative methods may be envisioned by those of ordinary skill in the art. For example, the window time may be set slightly in advance of the actual desired value; and the knock counter may be monitored for this very brief period to see if its count changes. Such a change means active knock at the beginning of the knock window. Alternatively, a separate input could be provided directly from a point in knock processor 37 which indicates knock activity. Assuming knock is not active at the beginning of the knock window, the present value of the knock counter is stored as a variable OLDPA3. The timer is then set in step 164 for an end of the knock window by increasing the start of window time by a value derived from a ROM table lookup on the basis of engine speed and any other desired engine operating parameters.

Since the timer interrupt is still enabled, an interrupt will be generated at the end of the window period which will again call the TIMER INTERRUPT routine. This time, the START flag is not set; and the knock counter increase is determined at step 151 by subtracting, from the current count, the count OLDPA3 from the beginning of the window, which count was stored in step 163 during the previous call of the routine. This increase is then added in step 166 to a variable NOK which is, as previously described, cleared to zero at the beginning of each 12.5 millisecond period. At high engine speeds, there may often be more than one cylinder firing within a 12.5 millisecond period; and the NOK value will thus be cumulative for the detected count increases during the period. Finally, the timer interrupt is disabled in step 167 before exit from the routine.

From decision point 162 during the first call of the subroutine, if knock is active at the beginning of the knock window, the routine proceeds from decision point 162 to step 167, in which the timer interrupt is disabled. In this case the knock window does not open at all; and no new knock is detected for this cylinder firing, with the result that NOK is unchanged. The beginning of the knock window is calibrated to begin before knock is expected. Therefore, a signal indicating "knock" activity at this time is most likely noise produced by the engine; and, under such conditions, a large proportion of the "knock" counts occurring during the window period would be noise. Not only would this produce significant immediate "false retard;" but, if the engine is equipped with an adaptive knock control, the adaptive cells will be contaminated by the noise to provide unnecessary retard for some time thereafter. Such an adaptive knock control is described in U.S. Ser. No. 07/601,075 by Bolander et al, filed Oct. 23, 1990, entitled Vehicle Engine Ignition Timing System with Adaptive Knock Retard and assigned to the assignee of this application, now U.S. Pat. No. 5,090,382. Thus, if knock activity is indicated at the beginning of the knock window, the window is not opened for that combustion event.

The embodiments of the invention in which an exclusive property or privilege is claimed are defined as follows:

1. In a spark ignited vehicle engine having a rotating crankshaft and a combustion chamber with combustion ignition apparatus, an ignition timing system comprising, in combination:
   means for generating a knock signal in response to knock in the combustion chamber, the knock signal being subject to contamination by noise;
   means for establishing a knock window corresponding to a predetermined crankshaft rotational angle in which knock is to be sensed;
   means for modifying a knock retard value in response to the knock signal generated during the knock window;
   means for establishing an ignition timing for activation of the combustion ignition apparatus at least partly in response to the knock retard value; and
   means responsive to the presence of the knock signal at the beginning of an occurrence of the knock window for preventing modification of the knock retard value in response to the knock signal during the occurrence of the time window.

2. The ignition timing system of claim 1 in which the means for generating a knock signal comprises a digital electronic apparatus with a knock register effective to maintain a count and further means for incrementing the count in a predetermined direction in response to predetermined patterns in an engine mounted vibration sensor, the means for modifying a knock retard value comprises a knock retard register which is changed in amount at the end of the knock window based on the cumulative change in the count during the knock window and the means for preventing modification of the knock retard value prevents operation of the means for modifying a knock retard value.

3. A method of ignition timing in a spark ignited internal combustion engine having a rotating ,, crankshaft and a combustion chamber with combustion ignition apparatus comprising the steps:
   sensing knock in the combustion chamber and generating a knock signal in response thereto, the knock signal being subject to contamination by noise;
   establishing a knock window corresponding to a predetermined crankshaft rotational angle in which knock is to be sensed;
   modifying a knock retard value in response to the knock signal generated during the knock window;
   establishing an ignition timing at least partly in response to the knock retard value;

activating the combustion ignition apparatus according to the ignition timing;
determining the presence of the knock signal at the beginning of the knock window; and
preventing modification of the knock retard value in response to the knock signal during the knock window when the presence of the knock signal is determined at the beginning thereof.

* * * * *